US012761589B2

(12) United States Patent
Takemasa et al.

(10) Patent No.: US 12,761,589 B2
(45) **Date of Patent: *Oct. 13, 2026**

(54) FIXING DEVICE AND IMAGE FORMING APPARATUS

(71) Applicant: CANON KABUSHIKI KAISHA, Tokyo (JP)

(72) Inventors: Rikiya Takemasa, Chiba (JP); Hidekazu Tatezawa, Saitama (JP); Takeshi Kozuma, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/823,913

(22) Filed: Sep. 4, 2024

(65) Prior Publication Data

US 2024/0427267 A1 Dec. 26, 2024

Related U.S. Application Data

(63) Continuation of application No. 18/172,026, filed on Feb. 21, 2023, now Pat. No. 12,111,593.

(30) Foreign Application Priority Data

Mar. 4, 2022 (JP) ................................ 2022-033276

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5045* (2013.01); *G03G 2215/2038* (2013.01)

(58) Field of Classification Search
CPC ............ G03G 15/205; G03G 15/2064; G03G 15/5045; G03G 2215/2038; G03G 15/2053; G03G 15/2032
See application file for complete search history.

(56) References Cited

U.S. PATENT DOCUMENTS 10,509,348 B2 12/2019 Okuno
12,111,593 B2 * 10/2024 Takemasa ........... G03G 15/205
(Continued)

FOREIGN PATENT DOCUMENTS

JP 2010256696 A 11/2010
JP 2012108241 A 6/2012
(Continued)

OTHER PUBLICATIONS

Quayle Action issued in U.S. Appl. No. 18/172,026 mailed Feb. 8, 2024.

(Continued)

*Primary Examiner* — Sandra Brase
(74) *Attorney, Agent, or Firm* — ROSSI, KIMMS & McDOWELL LLP

(57) ABSTRACT

A fixing device includes a heating rotating member and a pressure rotating member and performs image formation in one mode out of a plurality of modes including a first mode and a second mode. A time during which one of the heating rotating member and the pressure rotating member moves between an abutment position and a separation position in a case where the image formation is performed in the first mode is a first time, a time during which the one moves between the abutment position and the separation position in a case where the image formation is performed in the second mode is a second time, and the first time is shorter than the second time.

20 Claims, 19 Drawing Sheets

(56) References Cited

U.S. PATENT DOCUMENTS

| | | | |
|---|---|---|---|
| 2007/0230983 | A1 | 10/2007 | Nakamoto et al. |
| 2011/0222881 | A1 | 9/2011 | Yamada |
| 2012/0273478 | A1 | 11/2012 | Saito |
| 2020/0249596 | A1 | 8/2020 | Miyoshi et al. |

FOREIGN PATENT DOCUMENTS

| | | | |
|---|---|---|---|
| JP | 2016020944 | A | 2/2016 |
| JP | 2019124753 | A | 7/2019 |

OTHER PUBLICATIONS

Notice of Allowance issued in U.S. Appl. No. 18/172,026 mailed Jun. 7, 2024.

* cited by examiner

FIXING DEVICE AND IMAGE FORMING APPARATUS

BACKGROUND OF THE INVENTION

Field of the Invention

The present invention relates to a fixing device that fixes a toner image, formed on a recording material, onto the recording material, and an image forming apparatus including the fixing device.

Description of the Related Art

An image forming apparatus based on an electrophotographic system uses a fixing device to heat and press a recording material such as a sheet to which a toner image has been transferred by a transfer member, thereby fixing the toner image on the recording material. A general fixing device includes a heating member and a pressure member pressing the heating member, and fixes a toner image to a recording material by causing the recording material to which the toner image has been transferred to pass through a fixing nip portion where the heating member and the pressure member press each other.

Conventionally, fixing devices using a belt fixing system that uses a fixing belt and a pressure roller have been known. In an image forming apparatus using such a belt fixing system, the temperature of the fixing belt greatly changes a melted state of a toner on a recording material, and thus, is an important factor that affects the image quality. The surface temperature of the fixing belt in direct contact with the toner on the recording material is set to a high temperature in order to melt the toner as compared with the pressure roller which is a member opposing the fixing belt. In addition, in a case where image formation is continuously performed on a large number of recording materials, the temperatures of the fixing belt and the pressure roller need to be kept constant in order to make images on the respective recording materials have optimum and uniform quality.

Here, at the time of continuous image formation, there is a case where image formation is temporarily stopped by switching of a paper cassette, an adjusting operation of an image forming portion, or a post-processing operation on a recording material that has passed through a fixing device. In a case where the fixing belt and the pressure member rotate in the state of being in contact with each other without allowing passing of a recording material at the time of temporary stop of image formation, heat of the fixing belt set to a high temperature is transmitted to a surface of the pressure member, which causes a rise in the temperature of the pressure member. Then, in a case where image formation is restarted in the state where the temperature of the pressure member rises, a toner on a recording material on which an image is first formed after the restart is in an excessively melted state depending on a type of the recording material, which causes degradation of image quality such as excessively high glossiness.

Japanese Patent Application Laid-Open No. 2019-124753 discloses an image forming apparatus that prevents a temperature rise of a pressure roller that leads to such degradation of image quality. The image forming apparatus of Japanese Patent Application Laid-Open No. 2019-124753 includes a pressure applying/releasing mechanism that temporarily separates a fixing belt and the pressure roller pressing each other when image formation is temporarily stopped, and causes the fixing belt and the pressure roller to press each other again when the image formation is restarted.

In Japanese Patent Application Laid-Open No. 2019-124753, however, it takes time to move the pressure roller from a pressing position to a separation position and then return the pressure roller to the pressing position again. Therefore, in Japanese Patent Application Laid-Open No. 2019-124753, it is difficult to move the pressure roller to the separation position in a case where the time for temporarily stopping the image formation is shorter than the time for returning the pressure roller to the pressing position again after moving the pressure roller from the pressing position to the separation position. In such a case, Japanese Patent Application Laid-Open No. 2019-124753 has a problem that the fixing belt and the pressure roller are brought into contact with each other without allowing passing of a recording material so that it is difficult to sufficiently suppress the temperature rise of the pressure roller.

Further, Japanese Patent Application Laid-Open No. 2019-124753 has a problem that a waiting time (down time) until the pressing between the fixing belt and the pressure roller is completed is generated before the image formation is restarted when the pressure roller is moved to the separation position in order to suppress the temperature rise of the pressure roller.

Furthermore, it is conceivable that a user may desire to adjust a speed at which the fixing belt and the pressure roller are brought into and out of contact with each other in consideration of the priority according to a use situation, but Japanese Patent Application Laid-Open No. 2019-124753 does not mention the speed at which the fixing belt and the pressure roller are brought into and out of contact with each other.

SUMMARY OF THE INVENTION

An object of the present invention is to provide a fixing device and an image forming apparatus which are capable of suppressing a temperature rise of a pressure rotating member and capable of bringing the pressure rotating member and a fixing belt into and out of contact with each other at an optimum speed according to a use situation when a continuous job is interrupted.

A fixing device according to the present invention includes: a heating rotating member configured to be rotatable and apply heat to a recording material; a pressure rotating member configured to abut on the heating rotating member, be rotatable, and form a nip portion together with the heating rotating member; and a moving unit configured to move at least one of the heating rotating member and the pressure rotating member to an abutment position at which the nip portion is formed and a separation position at which the heating rotating member and the pressure rotating member are separated from each other. The heating rotating member and the pressure rotating member apply heat and pressure at the nip portion to fix a toner image to the recording material, and perform image formation in one mode out of a plurality of modes including a first mode and a second mode. A time during which the one moves between the abutment position and the separation position in a case where the image formation is performed in the first mode is a first time, a time during which the one moves between the abutment position and the separation position in a case where the image formation is performed in the second mode is a second time, and the first time is shorter than the second time.

Further features of the present invention will become apparent from the following description of exemplary embodiments (with reference to the attached drawings).

DESCRIPTION OF THE EMBODIMENTS

Figure 1:
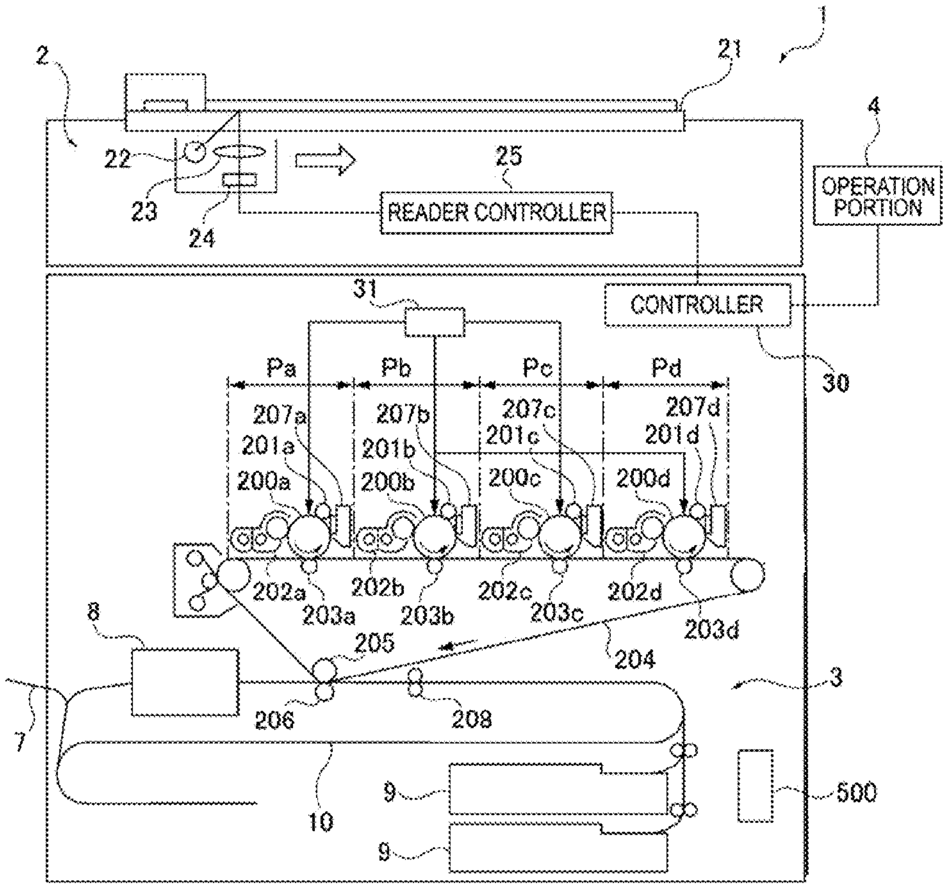
FIG. 1 is a schematic diagram of an image forming apparatus according to an embodiment of the present invention.

Hereinafter, embodiments will be described in detail with reference to the drawings.

First Embodiment

Configuration of Image Forming Apparatus

A configuration of an image forming apparatus 1 according to a first embodiment of the present invention will be described in detail with reference to FIG. 1.

Here, the image forming apparatus 1 is exemplified by a full-color printer adopting an electrophotographic system and including a plurality of photosensitive drums 200*a* to 200*d*. Further, the image forming apparatus 1 is a tandem type in which image forming portions Pa, Pb, Pc, and Pd are arranged along a rotation direction of an intermediate transfer belt 204 to be described later. Note that the image forming apparatus 1 is not limited to the full-color printer adopting the electrophotographic system, and may be image forming apparatuses adopting various systems or a monochromatic image forming apparatus.

Specifically, the image forming apparatus 1 includes an image reading portion 2, an apparatus body 3, and an operation portion 4.

The image reading portion 2 is connected to the apparatus body 3, and scans an original in a direction of an arrow illustrated in FIG. 1 to convert the original into an image signal of an electrical signal data string for each line. The image reading portion 2 includes an original base plate glass 21, a light source 22, an optical system member 23, a CCD sensor 24, and a reader controller 25.

The original is placed on the original base plate glass 21. The light source 22 irradiates the original placed on the original base plate glass 21 with light under the control of the reader controller 25.

The optical system member 23 is a lens or the like.

The CCD sensor 24 forms an image of reflected light of irradiation light from the light source 22, reflected by the original, via the optical system member 23 to obtain an image signal. The CCD sensor 24 outputs the obtained image signal to the reader controller 25.

The reader controller 25 controls the operation of the light source 22 under the control of a controller 30. The reader controller 25 outputs the image signal input from the CCD sensor 24 to the controller 30.

The apparatus body 3 forms a toner image (image) on a recording material (not illustrated) based on an image signal from a host device (not illustrated) such as a personal computer connected to be capable of communicating with the image reading portion 2 or the apparatus body 3. Here, the recording material is a sheet material such as paper or a plastic film.

The apparatus body 3 includes the image forming portions Pa, Pb, Pc, and Pd, a discharge tray 7, a fixing device 8, a cassette 9, a reverse conveying portion 10, a polygon scanner 31, an intermediate transfer belt 204, a secondary transfer roller 205, a secondary transfer roller 206, and a registration portion 208.

The image forming portions Pa, Pb, Pc, and Pd are provided to correspond to four colors of yellow, magenta, cyan, and black. The image forming portions Pa, Pb, Pc, and Pd perform image formation by image processing in the controller 30. The image forming portion Pa forms a yellow (Y) image. The image forming portion Pb forms a magenta (M) image. The image forming portion Pc forms a cyan (C) image. The image forming portion Pd forms a black (Bk) image.

The respective image forming portions Pa, Pb, Pc, and Pd have substantially the same configuration. The image forming portions Pa, Pb, Pc, and Pd respectively include photosensitive drums 200*a* to 200*d*, charging rollers 201*a* to 201*d*, development devices 202*a* to 202*d*, primary transfer rollers 203*a* to 203*d*, and cleaners 207*a* to 207*d*.

The photosensitive drums 200*a* to 200*d* are charged to a predetermined potential by the charging rollers 201*a* to 201*d*, respectively. The photosensitive drums 200*a* to 200*d* are irradiated with laser beams from the polygon scanner 31 to form electrostatic latent images. Toner images are formed on the photosensitive drums 200*a* to 200*d* by toners supplied from the development devices 202*a* to 202*d* based on an image signal, respectively.

The charging rollers 201*a* to 201*d* are primary chargers that charge surfaces of the photosensitive drums 200*a* to 200*d*, respectively, to the predetermined potential to prepare for the electrostatic latent image formation.

The development devices 202*a* to 202*d* develop the electrostatic latent images on the photosensitive drums 200*a* to 200*d* to form the toner images on the photosensitive drums 200*a* to 200*d*, respectively.

The primary transfer rollers 203*a* to 203*d* perform discharging from the back of the intermediate transfer belt 204, apply a primary transfer bias having an opposite polarity of the toner, and transfer the toner images on the photosensitive drums 200*a* to 200*d* onto the intermediate transfer belt 204.

The cleaners 207*a* to 207*d* clean the surfaces of the photosensitive drums 200*a* to 200*d* after the transfer of the toner images by the primary transfer rollers 203*a* to 203*d*.

A recording material conveyed from the fixing device 8 is discharged to the discharge tray 7.

The fixing device 8 serving as a fixing unit adopts a belt heating system using an endless belt. The fixing device 8 heats and presses a recording material conveyed from the secondary transfer roller 205 and the secondary transfer roller 206 to fix a toner image carried on the recording material to the recording material. The fixing device 8 conveys, to the discharge tray 7 or the reverse conveying portion 10, the recording material on which the toner image has been fixed. Details of a configuration of the fixing device 8 will be described later.

The cassette 9 houses recording materials.

The reverse conveying portion 10 reverses the front and back of a recording material conveyed from the fixing device 8 and conveys the recording material to the registration portion 208 in order to transfer and fix a toner image to a second surface (back surface) of the recording material.

The polygon scanner 31 is an exposure device that irradiates and scans the photosensitive drums 200*a* to 200*d* with laser beams according to an image signal under the control of the controller 30.

Toner images of the respective colors formed in the image forming portions Pa, Pb, Pc, and Pd are transferred onto the intermediate transfer belt 204 in the order of Y, M, C, and Bk from the image forming portions Pa, Pb, Pc, and Pd, and images of four colors are formed on a surface of the intermediate transfer belt 204.

The secondary transfer roller 205 and the secondary transfer roller 206 form a pair of secondary transfer rollers. The secondary transfer roller 205 and the secondary transfer roller 206 apply a secondary transfer electric field having an opposite polarity of a toner image on the intermediate transfer belt 204 to secondarily transfer the toner image on the intermediate transfer belt 204 to a recording material. The secondary transfer roller 205 and the secondary transfer roller 206 convey, to the fixing device 8, the recording material on which the toner image has been secondarily transferred.

The registration portion 208 includes, for example, a pair of registration rollers, and causes a recording material fed and conveyed from the cassette 9 or a recording material conveyed from the reverse conveying portion 10 to stand by. The registration portion 208 adjusts a timing of conveying a recording material to align a position of a toner image on the intermediate transfer belt 204 with a position of the recording material, and conveys the recording material on standby to the secondary transfer roller 205 and the secondary transfer roller 206.

The operation portion 4 serving as a selection unit is, for example, a touch panel, a button, or the like capable of a touch operation, and outputs an electrical signal corresponding to the operation to the controller 30. The operation portion 4 can be operated by an operator, and one mode can be selected from a plurality of modes to be described later.

Configuration of Fixing Device

The configuration of the fixing device 8 according to the first embodiment of the present invention will be described in detail with reference to FIGS. 2 to 10.

Figure 2:
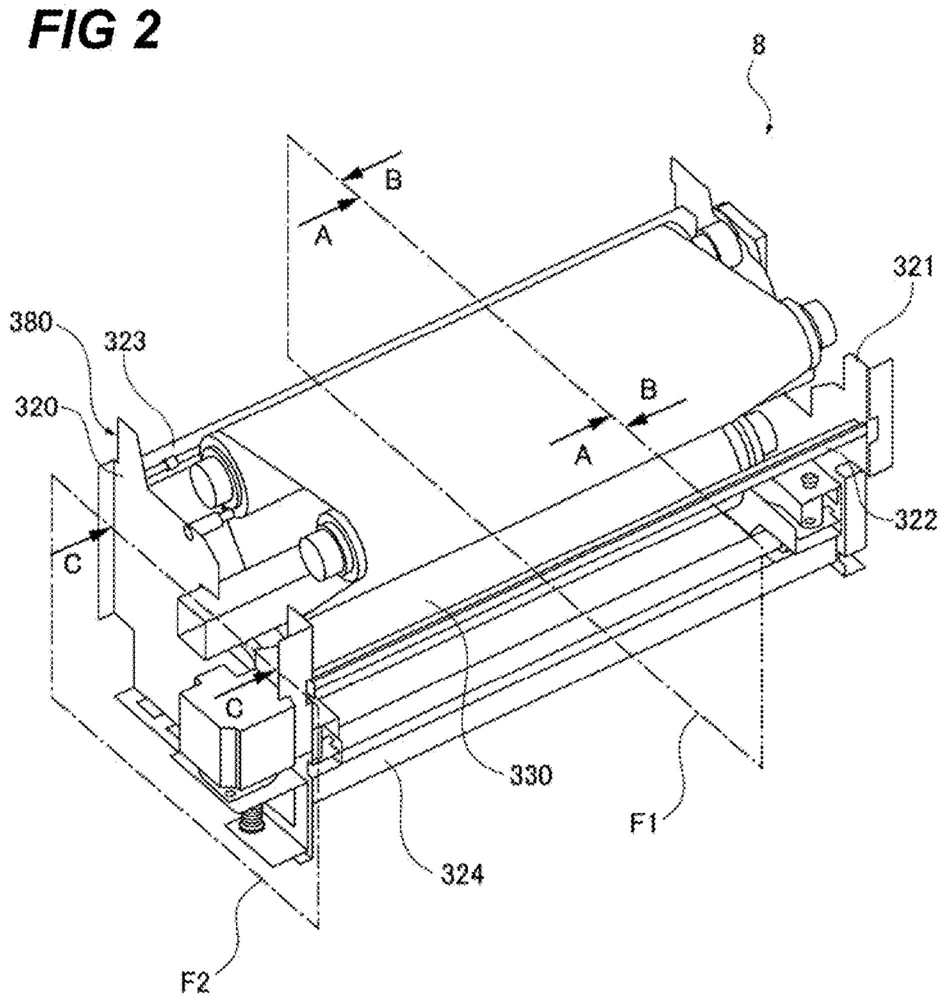
FIG. 2 is a perspective view of a fixing device according to the embodiment of the present invention.
Figure 3:
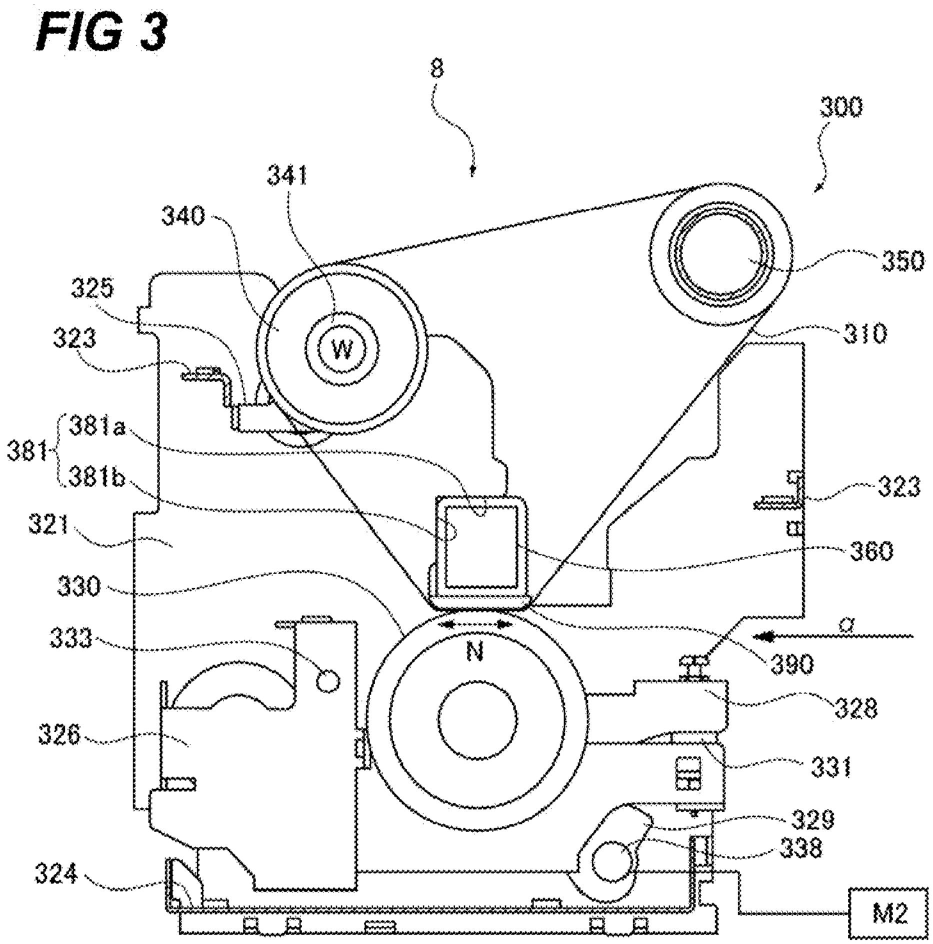
FIG. 3 is a cross-sectional view taken along a line A-A of FIG. 2.
Figure 4:
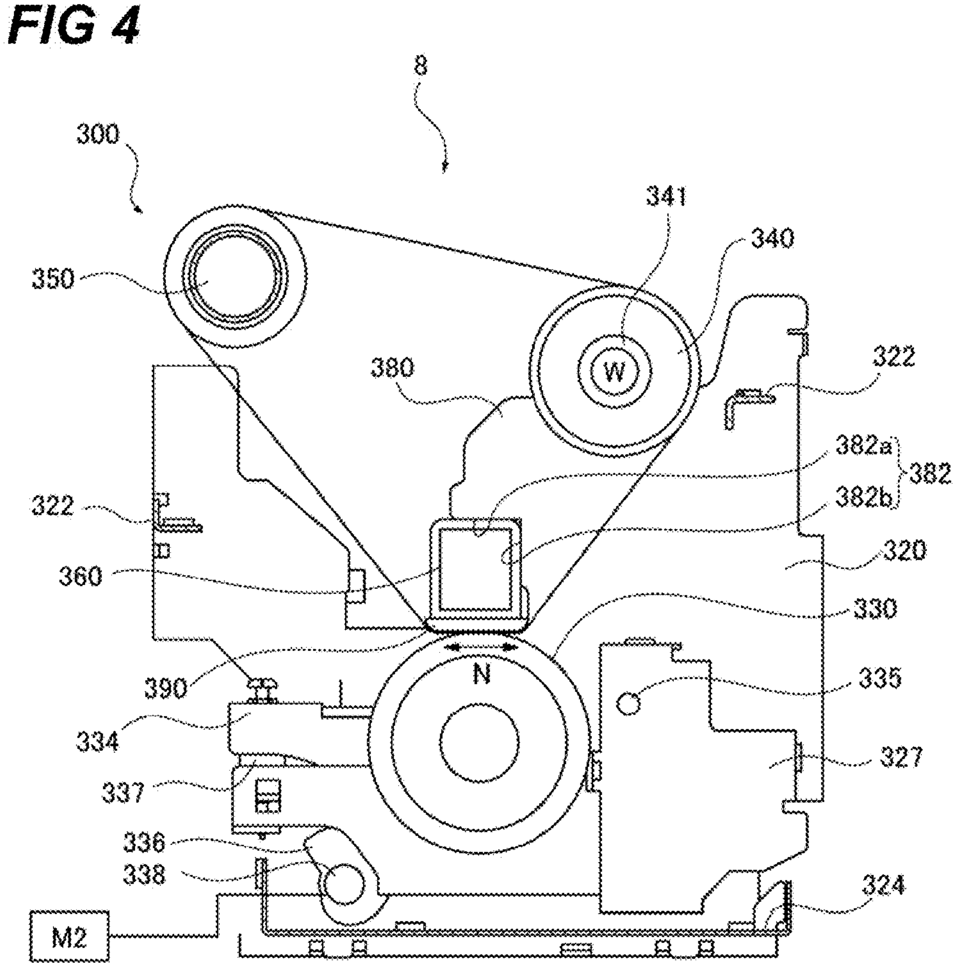
FIG. 4 is a cross-sectional view taken along a line B-B of FIG. 2.
Figure 5:
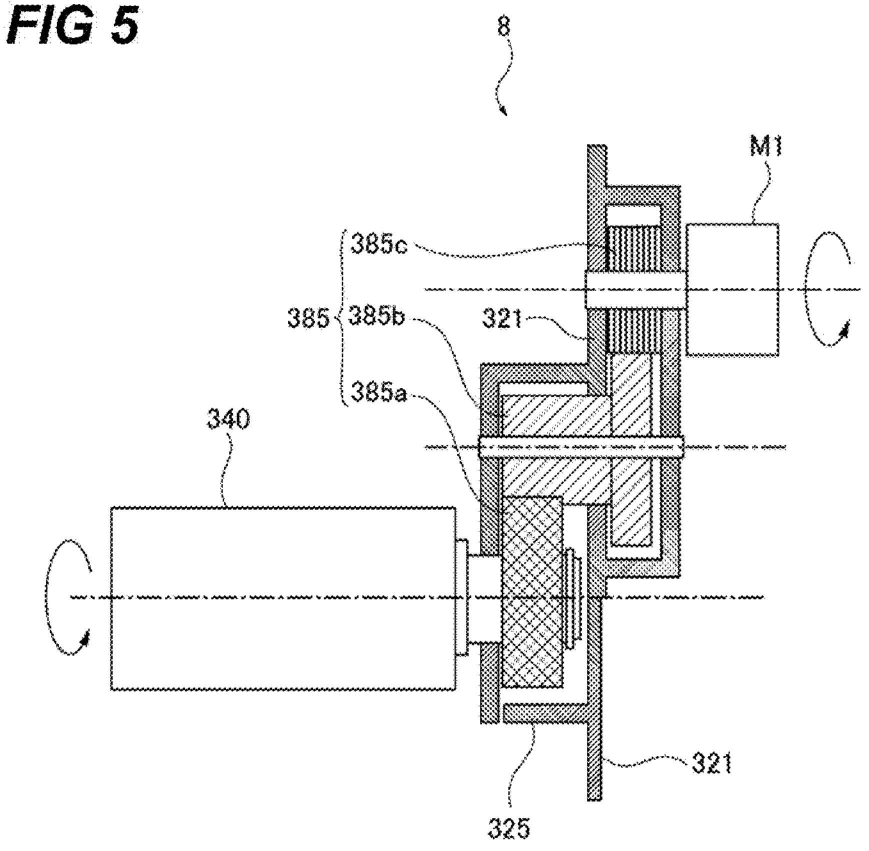
FIG. 5 is a schematic cross-sectional view of a part of the fixing device according to the embodiment of the present invention.

The lower left side and the upper right side of FIG. 2 represent the front side and the rear side, respectively. Further, a cut surface F1 and a cut surface F2 in FIG. 2 are cross sections orthogonal to a rotational axis of a pressure roller 330 of the fixing device 8. FIG. 3 is a view of the fixing device 8 as viewed from the front side on the cut surface F1. In FIG. 3, a recording material is conveyed from right to left as indicated by an arrow a. FIG. 4 is a view of the fixing device 8 as viewed from the rear side on the cut surface F1.

Figure 7:
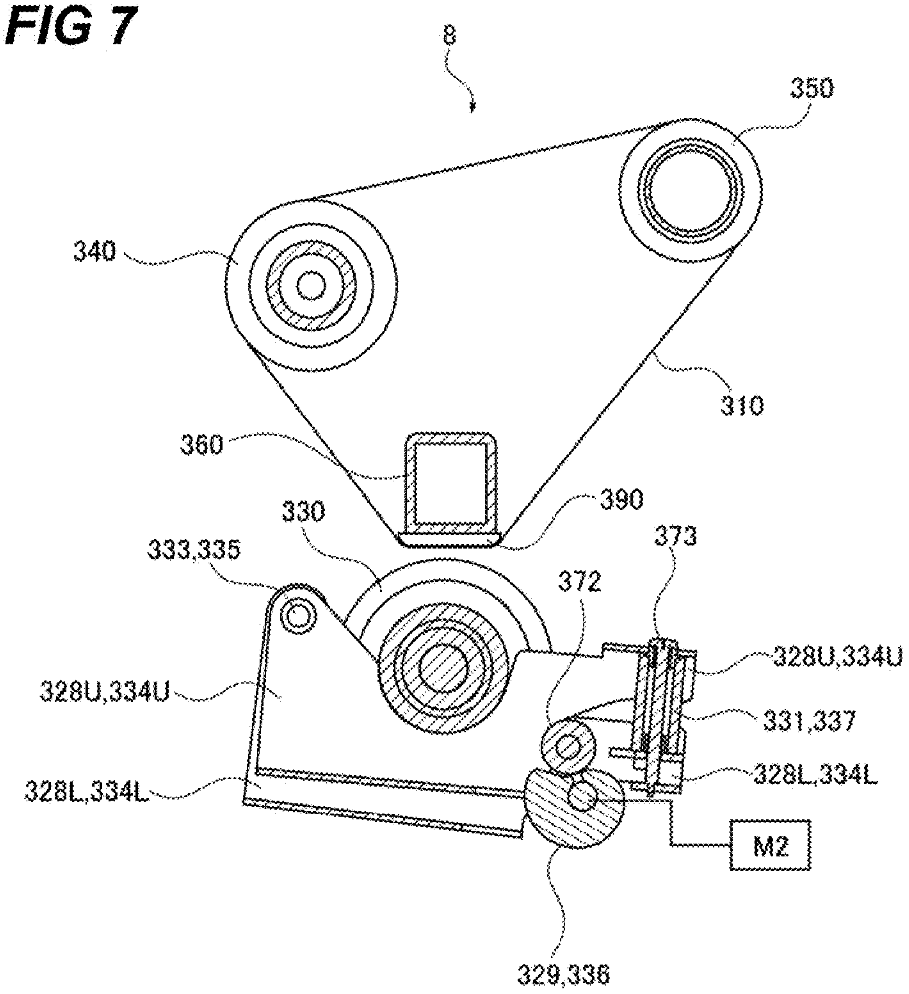
FIG. 7 is a cross-sectional view taken along a line C-C of FIG. 2 in a separation state.
Figure 8:
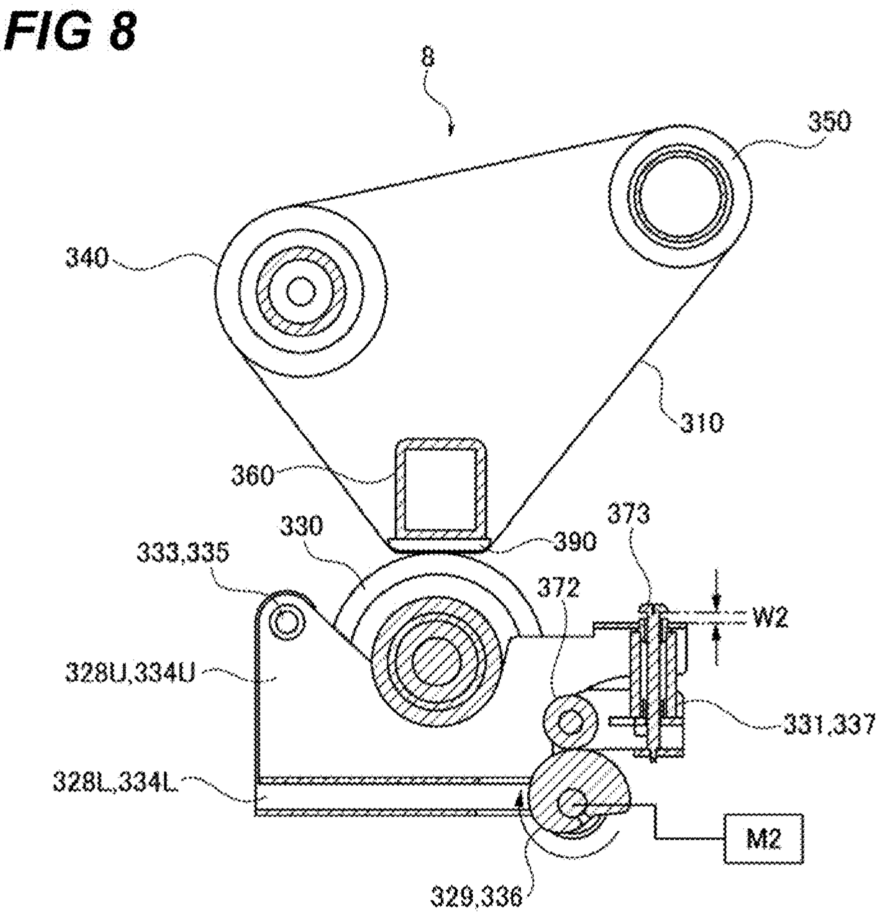
FIG. 8 is a cross-sectional view taken along the line C-C of FIG. 2 in a pressing state in a mode other than a glossiness priority mode.
Figure 9:
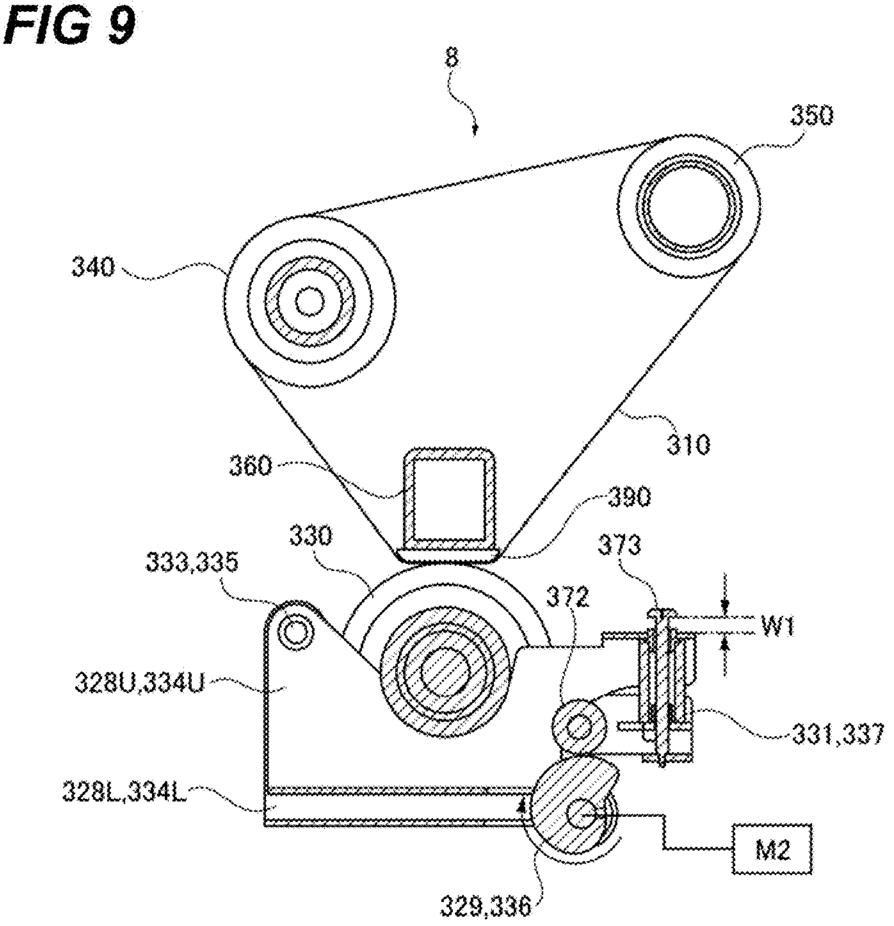
FIG. 9 is a cross-sectional view taken along the line C-C of FIG. 2 in a pressing state in the glossiness priority mode.
Figure 10:
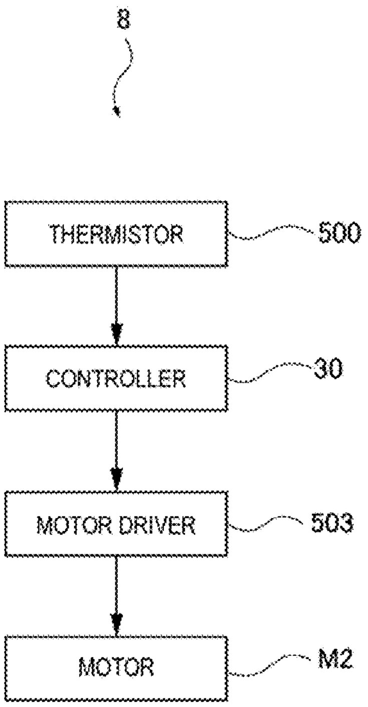
FIG. 10 is a block diagram illustrating a configuration of the fixing device according to the embodiment of the present invention.

FIGS. 7 to 9 are views of the fixing device 8 of FIG. 2 in the case of being cut along the cut surface F2 as viewed from a direction of an arrow C. FIGS. 7 to 9 illustrate a pressing state by transitions of a cam 329 and a cam 336. FIG. 8 illustrates a separation state in which the pressure roller 330 is separated from a fixing belt 310. FIG. 8 is a view on the cut surface F2 of FIG. 2 as viewed from the direction of the arrow C, and thus, the pressure arm 334 and the cam 336 are visible.

Specifically, the fixing device 8 includes the controller 30, a heating unit 300, a pressure arm support plate 326, a pressure arm support plate 327, a pressure arm 328, the cam 329, the pressure roller 330, a pressure spring 331, and a pressure arm 334. The fixing device 8 further includes the cam 336, a pressure spring 337, a halogen heater 341, a stay 360, a cam follower 372, a pressure screw 373, a fixing frame 380, and a gear train 385. The fixing device 8 further includes a pressure drive portion 391, a thermistor 500, a motor driver 503, a motor M1, and a motor M2. The pressure arm support plate 326, the pressure arm support plate 327, the pressure arm 328, the cam 329, the pressure spring 331, the pressure arm 334, the cam 336, the pressure spring 337, the cam follower 372, and the pressure screw 373 form a moving unit.

The controller 30 serving as a control unit controls the entire image forming apparatus 1. The controller 30 performs various settings and the like based on an electrical signal input from the operation portion 4 and executes a continuous job of continuously forming images on a plurality of recording materials. The controller 30 controls driving of the motor driver 503 by executing image forming processing to be described later based on an electrical signal corresponding to a type of a selected mode input from the operation portion 4 and an electrical signal corresponding to an environmental temperature input from the thermistor 500. Note that specific types of modes will be described later.

The controller 30 includes a central processing unit (CPU), a read only memory (ROM), and a random access memory (RAM), all of which are not illustrated. The ROM stores a program corresponding to a control procedure. The RAM stores work data or input data. The CPU reads the program stored in the ROM and controls each portion while referring to the working data or the input data stored in the RAM based on the read program or the like.

An image signal is input to the controller 30 from an external host device (not illustrated) such as a print server. The controller 30 performs pulse width modulation (PWM) control on the image signal input from the reader controller 25 or the external host device to control driving of the polygon scanner 31, thereby performing image processing suitable for each of the image forming portions Pa, Pb, Pc, and Pd.

The controller 30 controls the halogen heater 341 such that the fixing belt 310 has a predetermined target temperature according to a type of a recording material based on the environmental temperature indicated by the electrical signal input from the thermistor 500.

The heating unit 300 heats a recording material conveyed from the secondary transfer roller 205 and the secondary transfer roller 206. The heating unit 300 includes the fixing belt 310, a fixing pad 390, a heating roller 340, the halogen heater 341, a steering roller 350, and the stay 360.

The fixing belt 310 serving as a heating rotating member has a thin cylindrical shape, is an endless and rotatable belt, and applies heat to a recording material. The fixing belt 310 is made of a material having thermal conductivity and heat resistance. The fixing belt 310 is stretched over the fixing pad 390, the heating roller 340, and the steering roller 350. The fixing belt 310 is heated by the heating roller 340 heated by the halogen heater 341.

The fixing belt 310 has a three-layer structure in which a base layer (not illustrated), an elastic layer provided on the outer periphery of the base layer, and a toner parting layer provided on the outer periphery of the elastic layer are laminated. The base layer has a thickness of 60 μm and is made of a polyimide resin (PI). The elastic layer has a thickness of 300 μm and is made of silicone rubber. The toner parting layer has a thickness of 30 μm and is made of a tetrafluoroethylene perfluoroalkoxyethylene copolymer resin (PFA) which is a fluororesin.

The fixing pad 390 is supported by the stay 360 on the inner side of the fixing belt 310, and is arranged so as to oppose the pressure roller 330 with the fixing belt 310 interposed therebetween. The fixing pad 390 is made of a liquid crystal polymer (LCP). The fixing pad 390 is pressed by the pressure roller 330 with the fixing belt 310 interposed therebetween, thereby forming a nip portion N. The nip portion N has a predetermined width in a conveyance direction of a recording material (left-right direction in FIG. 3) and nips and conveys the recording material.

The fixing pad 390 is a substantially plate-shaped member whose longitudinal direction is a width direction of the fixing belt 310. Here, the width direction of the fixing belt 310 is the same direction as a direction intersecting a rotation direction of the fixing belt 310 and a rotational axis direction of the heating roller 340, and is a direction orthogonal to a sheet surface in FIG. 3.

A lubricating sheet (not illustrated) is provided between the fixing pad 390 and the fixing belt 310. A lubricant such as oil is applied in advance on a surface of the lubricating sheet in contact with the fixing belt 310 in order to improve slidability. As the lubricant, silicone oil is suitably used from the viewpoint of heat resistance, and those having various viscosities can be used according to use conditions.

The heating roller 340 is arranged on the inner side of the fixing belt 310, and stretches the fixing belt 310 together with the fixing pad 390 and the steering roller 350. The heating roller 340 is formed in a cylindrical shape using metal such as aluminum or stainless steel. For example, the heating roller 340 is formed using a stainless pipe having a thickness of 1 mm.

The heating roller 340 is rotatably supported by the fixing frame 380. The heating roller 340 has one end (rear end), to which a gear 385*a* is fixed, in a direction parallel to the rotational axis, indicated by an alternate long and short dash line in FIG. 5, and is connected to the motor M1 via an idler gear 385*b* and a motor gear 385*c*. The heating roller 340 is rotationally driven by the motor M1. A plurality of the halogen heaters 341 configured to heat the fixing belt 310 is arranged inside the heating roller 340.

The halogen heater 341 heats the heating roller 340 to a predetermined target temperature according to a type of a recording material under the control of the controller 30.

The steering roller 350 is arranged on the inner side of the fixing belt 310, stretches the fixing belt 310 together with the fixing pad 390 and the heating roller 340, and rotates following the fixing belt 310. The steering roller 350 tilts with respect to the rotational axis direction of the heating roller 340 to control a position (deviation position) of the fixing belt 310 with respect to the rotational axis direction of the heating roller 340.

The steering roller 350 generates a tension difference between one end side and the other end side in the width direction of the fixing belt 310 to move the fixing belt 310 in the width direction. The steering roller 350 is a tension roller that receives a force applied by a spring supported by a frame (not illustrated) of the heating unit 300 and applies a predetermined tension to the fixing belt 310. The steering roller 350 applies the predetermined tension to the fixing belt 310 to make the fixing belt 310 to abut on the fixing pad 390.

The stay 360 is a reinforcing member that is arranged on the inner side of the fixing belt 310, is provided along the width direction of the fixing belt 310, has the width direction of the fixing belt 310 as a longitudinal direction, and has rigidity. The stay 360 is arranged on the fixing pad 390 on an opposite side of the pressure roller 330, and abuts on the fixing pad 390 to support and reinforce the fixing pad 390. The stay 360 is made of metal such as stainless steel, and has a substantially rectangular cross section (traverse section) cut along a plane orthogonal to the width direction of the fixing belt 310. Both ends of the stay 360 in the longitudinal direction are supported by a fixing frame 380 of the fixing device 8.

The stay 360 is inserted into a heating unit positioning portion 381 and a heating unit positioning portion 382 and fixed to a fixing unit (not illustrated), thereby positioning the heating unit 300 with respect to the fixing frame 380. At this time, the stay 360 is fixed to the fixing unit in a state where movement is restricted by a pressure direction restricting surface 381*a*, the pressure direction restricting surface 382*a*, a conveyance direction restricting surface 381*b*, and a conveyance direction restricting surface 382*b* (see FIGS. 3 and 4).

As illustrated in FIG. 3, the pressure arm support plate 326 is fixed to a rear plate 321. The pressure arm support plate 326 rotatably supports the pressure arm 328.

As illustrated in FIG. 4, the pressure arm support plate 327 is fixed to a front plate 320. The pressure arm support plate 327 rotatably supports the pressure arm 334.

The pressure arm 328 rotatably supports the pressure roller 330. The pressure arm 328 is pressed by the cam 329 to rotate about a rotation shaft 333. As illustrated in FIGS. 7 to 9, the pressure arm 328 includes an upper arm portion 328U and a lower arm portion 328L. Each of the upper arm portion 328U and the lower arm portion 328L is supported by the pressure arm support plate 326 so as to be relatively rotatable about the rotation shaft 333.

The cam 329 is an eccentric cam, and is connected and fixed to one end in a longitudinal direction (direction orthogonal to a sheet surface in FIGS. 7 to 9) of a camshaft 338 serving as a rotation shaft.

The pressure roller 330 serving as a pressure rotating member is rotatably supported by the pressure arm 328 and the pressure arm 334 at both ends in a rotational axis direction (direction orthogonal to the sheet surface in FIGS. 7 to 9). The pressure roller 330 abuts on the fixing belt 310 to form the nip portion N together with the fixing belt 310.

The pressure roller 330 is formed by laminating a shaft, an elastic layer provided on the outer periphery of the shaft, and a toner parting layer provided on the outer periphery of the elastic layer. The shaft of the pressure roller 330 is made of stainless steel. The elastic layer of the pressure roller 330 has a thickness of 5 mm and is made of conductive silicone rubber. The toner parting layer of the pressure roller 330 has a thickness of 50 μm and is made of a tetrafluoroethylene perfluoroalkoxyethylene copolymer resin (PFA) which is a fluororesin.

The pressure spring 331 serving as a force applying unit applies a force to the pressure roller 330 with respect to the fixing pad 390 via the pressure arm 328 and the pressure arm 334. The pressure spring 331 is arranged in an elastically compressed state between a right end of the upper arm portion 328U in FIG. 9 and a right end of the lower arm portion 328L in FIG. 9. The pressure spring 331 applies a force to the upper arm portion 328U and the lower arm portion 328L in a direction in which an interval between the right end of the upper arm portion 328U and the right end of the lower arm portion 328L is widened.

The pressure arm 334 rotatably supports the pressure roller 330. The pressure arm 334 is pressed by the cam 336 to rotate about a rotation shaft 335. As illustrated in FIGS. 7 to 9, the pressure arm 334 includes an upper arm portion 334U and a lower arm portion 334L. Each of the upper arm portion 334U and the lower arm portion 334L is supported by the pressure arm support plate 327 so as to be relatively rotatable about the rotation shaft 335. The pressure arm 334 has the same configuration as the pressure arm 328.

The cam 336 is an eccentric cam, and is connected and fixed to the other end in the longitudinal direction of the camshaft 338 serving as the rotation shaft. The cam 336 has the same configuration as the cam 329 and rotates in the same phase as the cam 329.

The pressure spring 337 serving as the force applying unit applies a force to the pressure roller 330 with respect to the fixing pad 390. The pressure spring 337 is arranged in an elastically compressed state between a right end of the upper arm portion 334U in FIG. 9 and a right end of the lower arm portion 334L in FIG. 9. The pressure spring 337 applies a force to the upper arm portion 334U and the lower arm portion 334L in a direction in which an interval between the right end of the upper arm portion 334U and the right end of the lower arm portion 334L is widened.

The cam follower 372 is rotatably supported by the lower arm portion 328L and the lower arm portion 334L so as to be in contact with the cam 329 and the cam 336.

The pressure screw 373 restricts the relative movement between the upper arm portion 328U and the lower arm portion 328L such that the interval between the upper arm portion 328U and the lower arm portion 328L is not widened beyond a predetermined interval. The pressure screw 373 restricts the relative movement between the upper arm portion 334U and the lower arm portion 334L such that the interval between the upper arm portion 334U and the lower arm portion 334L is not widened beyond a predetermined interval.

The pressure screw 373 allows the relative movement between the upper arm portion 328U and the lower arm portion 328L in a direction in which the interval between the upper arm portion 328U and the lower arm portion 328L is narrowed. The pressure screw 373 allows the relative movement between the upper arm portion 334U and the lower arm portion 334L in a direction in which the interval between the upper arm portion 334U and the lower arm portion 334L is narrowed.

As illustrated in FIG. 2, the fixing frame 380 includes the front plate 320, the rear plate 321, a right stay 322, a left stay 323, and a bottom plate 324.

As illustrated in FIG. 4, the front plate 320 includes the heating unit positioning portion 382.

The heating unit positioning portion 382 includes the pressure direction restricting surface 382*a* opposing the pressure roller 330 and the conveyance direction restricting surface 382*b* which is an abutting surface in an insertion direction of the heating unit 300.

As illustrated in FIG. 3, the rear plate 321 includes the heating unit positioning portion 381.

The heating unit positioning portion 381 includes the pressure direction restricting surface 381*a* opposing the pressure roller 330 and the conveyance direction restricting surface 381*b* which is an abutting surface in the insertion direction of the heating unit 300.

The gear train 385 includes the gear 385*a*, the idler gear 385*b*, and the motor gear 385*c*. The gear train 385 transmits a driving force of the motor M1 to the heating roller 340.

The gear 385*a* is fixed to the one end of the heating roller 340 in the rotational axis direction. The gear 385*a* transmits a driving force of the idler gear 385*b* to the heating roller 340.

The idler gear 385*b* is rotatably supported by a heating roller driving support plate 325 fixed to the rear plate 321. The idler gear 385*b* meshes with the motor gear 385*c* and the gear 385*a*. The idler gear 385*b* transmits a driving force of the motor gear 385*c* to the gear 385*a*.

The motor gear 385*c* transmits the driving force of the motor M1 to the idler gear 385*b*.

The pressure drive portion 391 serving as an abutment/separation unit transmits a driving force of the motor M2 to the cam 329 and the cam 336 to rotate the cam 329 and the cam 336. Details of a configuration of the pressure drive portion 391 will be described later.

The thermistor 500 serving as a temperature detection portion detects an environmental temperature and outputs an electrical signal corresponding to the detected environmental temperature to the controller 30.

The motor driver 503 controls driving of the motor M2 under the control of the controller 30.

The motor M1 is driven to rotate the heating roller 340 via the gear train 385.

The motor M2 is driven under the control of the motor driver 503 to rotate the cam 329 and the cam 336. The motor M2 rotates at a rotation speed controlled by the motor driver 503 to adjust an abutment/separation speed of the pressure roller 330 with respect to the fixing belt 310.

Configuration of Pressure Drive Portion

The configuration of the pressure drive portion 391 of the fixing device 8 according to the first embodiment of the present invention will be described in detail with reference to FIG. 6.

The pressure drive portion 391 includes a worm wheel 392, a worm gear 393, a pair of bearings 399, a pressure drive gear 395, and a gear 394.

The worm wheel 392 is fixed to one end in an axial direction (direction orthogonal to a sheet surface in FIG. 6) of the camshaft 338 which is the rotation shaft of the cam 329 and the cam 336.

The worm gear 393 is provided on a rotation shaft that rotates by the driving of the motor M2, and meshes with the worm wheel 392.

Figure 6:
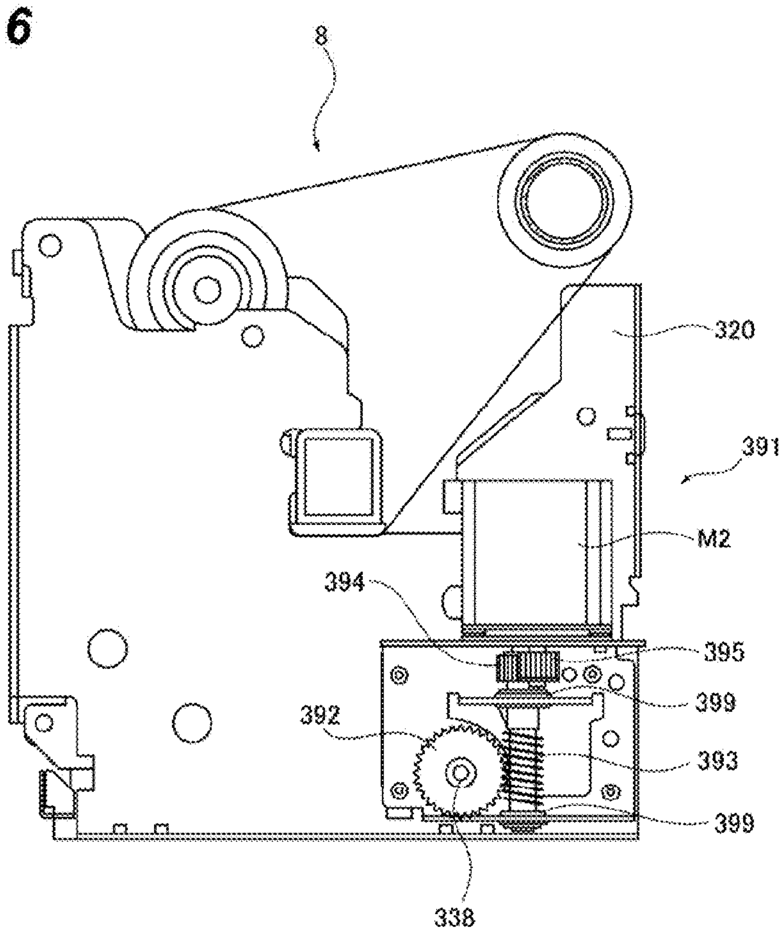
FIG. 6 is a cross-sectional view of the fixing device according to the embodiment of the present invention from which a drive transmission portion is exposed.

The pair of bearings 399 supports both ends of the worm gear 393 in a rotational axis direction (vertical direction in FIG. 6).

The pressure drive gear 395 is provided on a drive shaft of the motor M2, and rotates when the motor M2 is driven.

The gear 394 is provided at one end of the worm gear 393 in the rotational axis direction, and meshes with the pressure drive gear 395.

Type of Mode

The types of modes selected by the operation portion 4 of the image forming apparatus 1 according to the first embodiment of the present invention will be described in detail.

A user can select an "image quality priority mode", a "productivity priority mode", a "silence priority mode", or a "glossiness priority mode" using the operation portion 4.

The "image quality priority mode", which is a fourth mode, is a mode for performing optimum fixing processing on various recording materials. The "productivity priority mode", which is a first mode, is a mode for coping with a user's need to shorten a temporary stop time (down time) of image formation. The "silence priority mode", which is a second mode, is a mode in which an operating sound of the pressure drive portion 391 is set to be silent in order to cope with a user's need to operate the image forming apparatus 1 silently in an office environment or the like.

The "glossiness priority mode", which is a third mode, is a mode in which a pressing force (nip pressure) acting on the nip portion N is changed in order to cope with a user's need to improve the glossiness of a coated sheet or to perform printing on a special film sheet. The "glossiness priority mode" is a mode for performing optimum fixing processing on various recording materials such as a special sheet such as plain paper, a thick sheet, or a film sheet due to diversification of media that can be supported by the image forming apparatus 1 in recent years.

In this manner, the "image quality priority mode" is a mode in which productivity and silence are balanced. The "productivity priority mode" and the "glossiness priority mode" are modes in which priority is given to the productivity or the glossiness by shortening a time during which a job is interrupted at the expense of the silence. The "silence priority mode" is a mode in which priority is given to the silence by making the operating sound silent at the expense of the productivity. In this manner, each of the modes corresponds to the need according to a use situation of the user.

Operation of Cam

The operation of the cam 329 and the cam 336 of the fixing device 8 according to the first embodiment of the present invention will be described in detail with reference to FIGS. 11A and 11B.

Figure 11A:
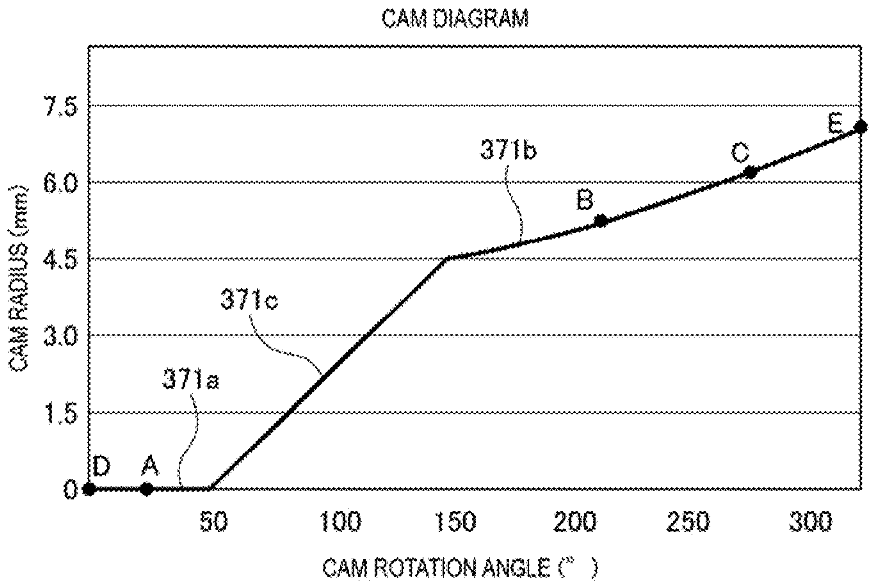
FIG. 11A is a view illustrating a relationship between a rotation angle of a cam of the fixing device according to the embodiment of the present invention and a radius of the cam and FIG. 11B is a schematic view of the cam.
Figure 11B:
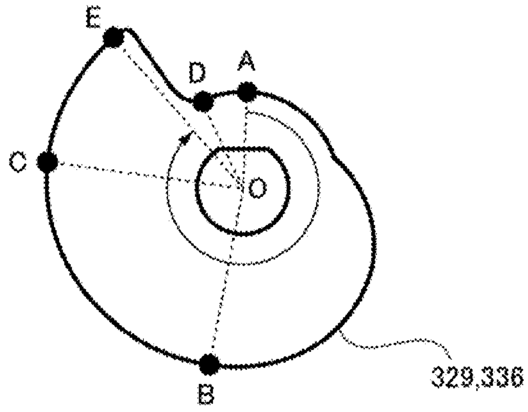

In FIGS. 11A and 11B, FIG. 11A is a cam diagram of the cam 329 and the cam 336, and FIG. 11B is a schematic view of the cam 329 and the cam 336 corresponding to the cam diagram of FIG. 11A.

The cam 329 and the cam 336 rotate clockwise in FIG. 11B from a point D as a start and to a point E. The cam diagram which is a relationship between a rotation angle (phase) and a cam radius of the cam 329 and the cam 336 at this time is given as illustrated in FIG. 11A. In FIG. 11A, the cam radius is illustrated with the point D as a reference (0 mm).

As illustrated in FIG. 11A, the cam 329 and the cam 336 include a cam flat surface 371*a*, a cam angle surface 371*b*, and a cam transition surface 371*c*.

Here, the cam flat surface 371*a* is formed in a separation phase range of the cam 329 and the cam 336 in which the pressure roller 330 and the fixing belt 310 are separated from each other, and is a surface including a point A.

In addition, the cam flat surface 371*a* is a flat surface substantially orthogonal to a direction of a reaction force applied from the cam follower 372 in a state where the cam 329 and the cam 336 are in contact with the cam follower 372.

The cam angle surface 371*b* is formed in a pressing phase range of the pressure roller 330 forming the nip portion N of the cam 329 and the cam 336. Further, the cam angle surface 371*b* is a surface configured to make the pressure roller 330 abut on the fixing belt 310, and is a surface configured to change the pressing force of the pressure roller 330.

The cam transition surface 371*c* is a connection surface connecting the cam flat surface 371*a* and the cam angle surface 371*b*. The cam transition surface 371*c* is the connection surface configured to move the pressure roller 330 from a position where the pressure roller 330 is separated from the fixing belt 310 to a position where the pressure roller 330 abuts on the fixing belt 310.

The cam angle surface 371*b* and the cam transition surface 371*c* are formed such that the cam radius, which is a distance from a rotation center O, increases as the rotation angle increases when the cam 329 and the cam 336 rotate in an arrow direction in FIG. 11B.

A point B on the cam angle surface 371*b* is a point at which the pressing force is applied from the pressure roller 330 to the fixing pad 390 when fixing processing is performed in the "image priority mode", the "productivity priority mode", or the "silence priority mode". A point C on the cam angle surface 371*b* is a point at which the pressing force is applied from the pressure roller 330 to the fixing pad 390 when the fixing processing is performed in the "glossiness priority mode". In this manner, the cam 329 and the cam 336 can change the pressing force acting on the nip portion Nin two stages at the points B and C. Note that the pressing force applied to the nip portion N may be changeable in three or more stages without being not limited to the case of being changeable in the two stages.

Operation of Fixing Device

The operation of the fixing device 8 according to the first embodiment of the present invention will be described in detail with reference to FIGS. 2 to 12.

The cam 329 and the cam 336 can bring the pressure roller 330 into and out of contact with the fixing belt 310 by rotating by a driving force of the motor M2 transmitted via the pressure drive portion 391 (see FIG. 6) when the motor M2 is driven.

Specifically, as illustrated in FIG. 6, the pressure drive gear 395 rotates by the driving of the motor M2, and accordingly, the gear 394 meshing with the pressure drive gear 395 rotates and the worm gear 393 rotates. When the worm wheel 392 meshing with the worm gear 393 rotates, the cam 329 and the cam 336 rotate via the camshaft 338 to which the worm wheel 392 is fixed.

When the cam 329 and the cam 336 rotate, positions of the pressure arm 328 and the pressure arm 334 are changed to cause the fixing belt 310 and the pressure roller 330 to abut on or to be separated from each other. In addition, when the cam 329 and the cam 336 rotate, the pressing force of the pressure roller 330 with respect to the fixing pad 390 is changed to change the nip pressure at the nip portion N between the fixing belt 310 and the pressure roller 330.

Next, the operation of the fixing device 8 will be described in more detail.

First, details of the operation of the fixing device 8 in a case where fixing processing on a recording material is not performed will be described.

In the case where the fixing processing to a recording material is not performed, the cam 329 and the cam 336 rotate as the motor M2 is driven, and move the pressure arm 328 and the pressure arm 334 in a separation direction. As a result, the fixing belt 310 and the pressure roller 330 are separated from each other to release the nip and stand by as illustrated in FIG. 7.

At this time, the cam follower 372 abuts on the cam 329 and the cam 336 at the point A illustrated in FIGS. 11A and 11B. In addition, the interval between the upper arm portion 328U and the lower arm portion 328L and the interval between the upper arm portion 334U and the lower arm portion 334L are restricted by the pressure screw 373.

Next, details of the operation of the fixing device 8 in a case where fixing processing is performed in the "image quality priority mode", the "productivity priority mode", or the "silence priority mode" will be described.

In the case where the fixing processing is performed in the "image quality priority mode", the "productivity priority mode", or the "silence priority mode", the cam 329 and the cam 336 rotate in the arrow direction of FIGS. 11A and 11B until abutting on the cam follower 372 at the point B illustrated in FIG. 11B as the motor M2 is driven.

As a result, the lower arm portion 328L of the pressure arm 328 and the lower arm portion 334L of the pressure arm 334 are pushed up by the cam 329 and the cam 336 via the cam follower 372. Accordingly, the upper arm portion 328U and the upper arm portion 334U are pushed up the elastic forces of the pressure spring 331 and the pressure spring 337. Then, the pressure roller 330 supported by the upper arm portion 328U and the upper arm portion 334U abuts on the fixing belt 310. As a result, the nip portion N is formed between the fixing belt 310 and the pressure roller 330.

At the nip portion N, the fixing processing of heating a toner image while nipping and conveying a recording material carrying the toner image and fixing the toner image on the recording material is performed.

At this time, the upper arm portion 328U and the upper arm portion 334U are restricted from moving as the pressure roller 330 abuts on the fixing belt 310. On the other hand, the lower arm portion 328L and the lower arm portion 334L relatively move upward. Accordingly, the pressure spring 331 and the pressure spring 337 are compressed by W1 as illustrated in FIG. 9. In addition, the upper arm portion 328U and the upper arm portion 334U receive the forces applied by the pressure spring 331 and the pressure spring 337, and can apply a pressing force to the nip portion N. This pressing force is, for example, 1000 N.

Figure 12:
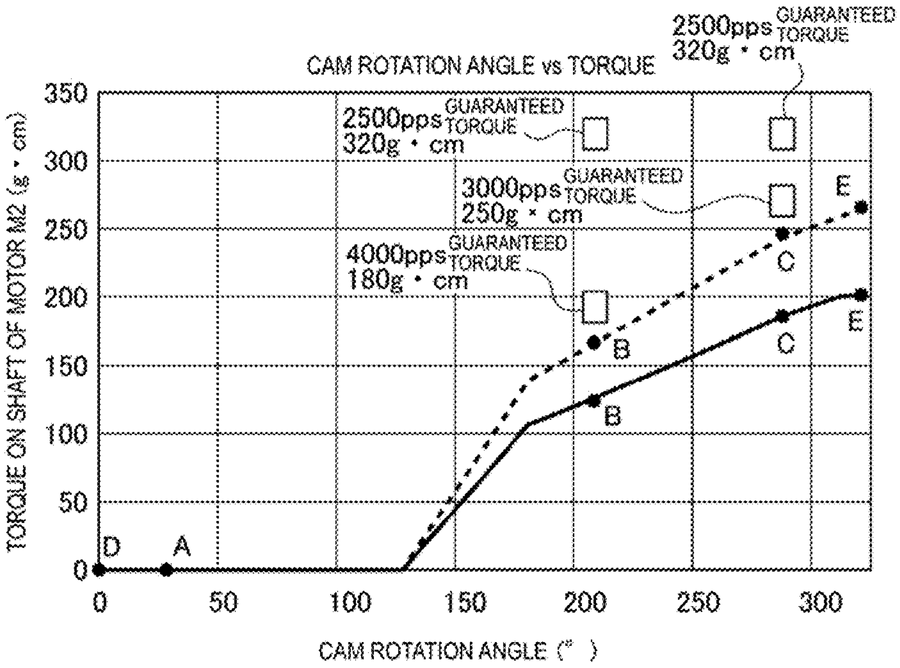
FIG. 12 is a view illustrating a relationship between a rotation angle of the cam of the fixing device according to the embodiment of the present invention and a torque on a shaft of a motor M2.

Here, a driving torque for rotationally driving the pressure roller 330 at the point B is illustrated in FIG. 12. In FIG. 12, a solid line indicates a driving torque when an environmental temperature is 23° C., and a broken line indicates a driving torque when the environmental temperature is 10° C. As illustrated in FIG. 12, the driving torque at the point B is 130 g·cm at the environmental temperature of 23° C., and increases to 160 g·cm at the environmental temperature of 10° C. or lower. The reason why the driving torque increases in this manner is that a driving resistance in the nip portion N increases as rubber of the pressure roller 330 is cured due to a decrease in the environmental temperature.

In a case where image formation is temporarily stopped in the "image quality priority mode", the motor M2 is driven at 2500 pps. At this time, in a case where the pressure roller 330 is moved from an abutment position to a separation position in order to prevent a temperature rise of the pressure roller 330, a waiting time (down time) until re-pressing of the fixing belt 310 and the pressure roller 330 is completed before the image formation is restarted is about 6 seconds.

In addition, in a case where image formation is temporarily stopped for switching from a fixing temperature for plain paper having a basis weight of 105 gsm to a fixing temperature for a thin sheet having a basis weight of 64 gsm, a temporary stop time is 4 seconds. Therefore, in the case where the image formation is temporarily stopped in the "image quality priority mode", the user waits for about 2 seconds for the pressure roller 330 to abut on and to be separated from the fixing belt 310.

On the other hand, in a case where image formation is temporarily stopped in the "productivity priority mode", the motor M2 is driven at 4000 pps. At this time, in a case where the pressure roller 330 is moved from an abutment position to a separation position in order to prevent a temperature rise of the pressure roller 330, a waiting time (down time) until re-pressing of the fixing belt 310 and the pressure roller 330 is completed before the image formation is restarted is about 4 seconds. Therefore, in this case, since the temporary stop time and the waiting time (down time) are the same at about 4 seconds, the user does not have to wait for the pressure roller 330 to abut on and to be separated from the fixing belt 310. Here, the waiting time until the completion of re-pressing of the fixing belt 310 and the pressure roller 330 in the "productivity priority mode" is a first time. The pressure roller 330 moves at a first speed from the separation position to the abutment position in the "productivity priority mode".

When the "productivity priority mode" is set in this manner, it is possible to cope with the user's need to shorten the temporary stop time (down time) of the image formation.

However, as illustrated in FIG. 12, a guaranteed torque when the motor M2 is driven at 4000 pps decreases to 180 g·cm as compared with a guaranteed torque when the motor M2 is driven at 2500 pps. Thus, when the motor M2 is driven at 4000 pps, there is a risk (step-out risk of the motor M2) that it is difficult to secure a sufficient safety factor in a low temperature environment so that the motor M2 is not driven. Therefore, the "productivity priority mode" can be selected when the environmental temperature is 18° C. or higher.

Next, details of the operation of the fixing device 8 in a case where fixing processing is performed in the "glossiness priority mode" will be described.

In the case where the fixing processing is performed in the "glossiness priority mode", the cam 329 and the cam 336 rotate in the arrow direction of FIGS. 11A and 11B until abutting on the cam follower 372 at the point C illustrated in FIG. 11B as the motor M2 is driven.

As a result, the lower arm portion 328L and the lower arm portion 334L are further pushed up, and the pressure spring 331 and the pressure spring 337 are also further compressed. As the cam 329 and the cam 336 rotate until abutting on the cam follower 372 at the point C, a compression amount of each of the pressure spring 331 and the pressure spring 337 becomes W2 (W2>W1) larger than a compression amount W1 of plain paper as illustrated in FIG. 8. In addition, the upper arm portion 328U and the upper arm portion 334U receive the forces applied by the pressure spring 331 and the pressure spring 337, and can apply a pressing force of, for example, 1500 N to the nip portion N.

Here, a driving torque for rotationally driving the pressure roller 330 at the point C is illustrated in FIG. 12. As illustrated in FIG. 12, the driving torque at the point C increases to 170 g·cm when the environmental temperature is 23° C., and to 240 g·cm in a low temperature environment where the environmental temperature is 10° C. or lower.

In a case where image formation is temporarily stopped in the "glossiness priority mode", the motor M2 is driven at 3000 pps. At this time, in a case where the pressure roller 330 is moved from an abutment position to a separation position in order to prevent a temperature rise of the pressure roller 330, a waiting time (down time) until re-pressing of the fixing belt 310 and the pressure roller 330 is completed before the image formation is restarted is about 5 seconds.

In addition, in a case where image formation is temporarily stopped for switching from a fixing temperature for a thick sheet having a basis weight of 200 gsm to a fixing temperature for a thin sheet having a basis weight of 64 gsm, a temporary stop time is 5 seconds. Therefore, in the case where the image formation is temporarily stopped in the "glossiness priority mode", the temporary stop time and the waiting time (down time) are the same at about 5 seconds, and thus, the user does not have to wait for the pressure roller 330 to abut on and to be separated from the fixing belt 310.

However, a guaranteed torque when the motor M2 is driven at 3000 pps decreases to 250 g·cm as illustrated in FIG. 12. Thus, when the motor M2 is driven at 3000 pps, there is a risk that it is difficult to secure a sufficient safety factor in a low temperature environment so that the motor M2 is not driven. Therefore, the "glossiness priority mode" can be selected when the environmental temperature is 18° C. or higher.

When the "glossiness priority mode" is set in this manner, it is possible to cope with the user's need to increase the glossiness of a coated sheet or to perform printing on a special film sheet.

Figure 13:
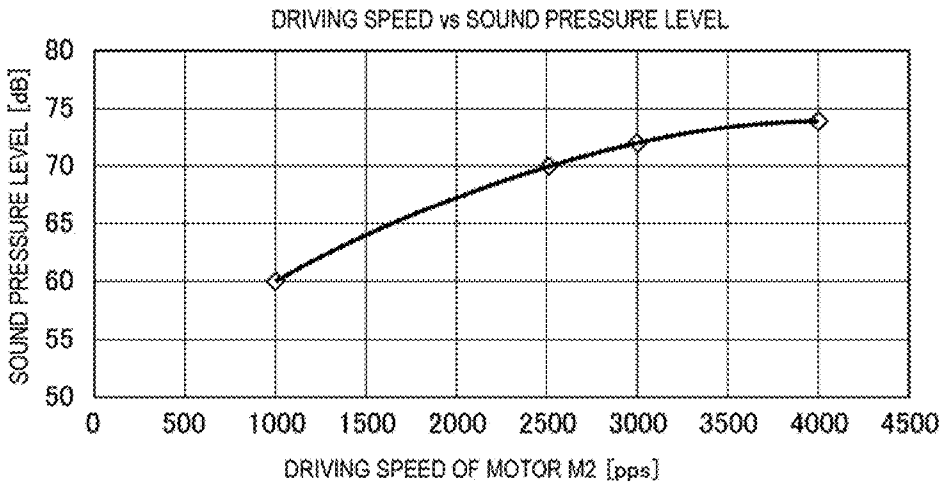
FIG. 13 is a view illustrating a relationship between a sound pressure level of the fixing device according to the embodiment of the present invention and a driving speed of the motor.

Next, in a case where image formation is temporarily stopped in the "silence priority mode", the motor M2 is driven at 1000 pps. Here, as illustrated in FIG. 13, it is effective to reduce vibration energy by reducing a rotational speed and a driving speed of the motor M2 in order to reduce a driving sound.

At this time, in a case where the pressure roller 330 is moved from an abutment position to a separation position in order to prevent a temperature rise of the pressure roller 330, a waiting time (down time) until re-pressing of the fixing belt 310 and the pressure roller 330 is completed before the image formation is restarted is about 8 seconds. However, in the "silence priority mode", noise due to the image forming apparatus 1 can be suppressed by reducing the rotational speed and the driving speed of the motor M2. As a result, it is possible to cope with the user's need to operate the image forming apparatus 1 silently in the office environment. Here, the waiting time until the completion of re-pressing of the fixing belt 310 and the pressure roller 330 in the "silence priority mode" is a second time. The pressure roller 330 moves at a second speed from the separation position to the abutment position in the "silence priority mode". The first speed is higher than the second speed.

Image Forming Processing

The image forming processing executed by the image forming apparatus 1 according to the embodiment of the present invention will be described in detail with reference to FIGS. 14A and 14B.

Figure 14A:
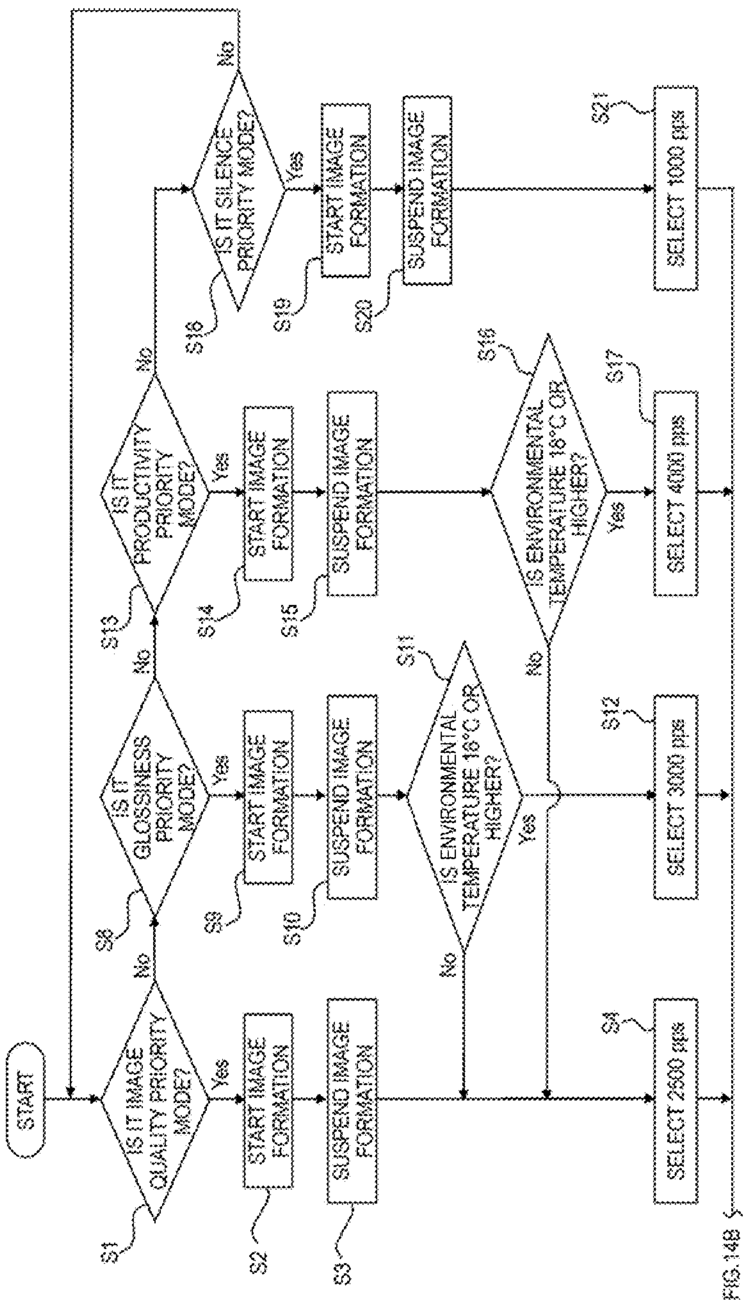
FIGS. 14A and 14B are a flowchart of image forming processing executed by the fixing device according to the embodiment of the present invention.
Figure 14B:
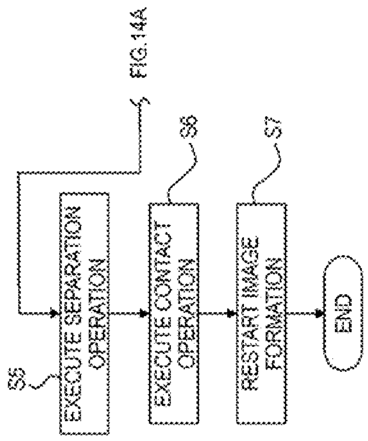

The image forming processing illustrated in FIGS. 14A and 14B is started at a timing when a main power supply (not illustrated) of the image forming apparatus 1 is turned on.

First, the controller 30 determines whether the image quality priority mode is selected (S1).

In a case where the image quality priority mode is selected (step S1: Yes), the controller 30 acquires recording material information regarding a type and a basis weight of a recording material from the operation portion 4, and starts image formation when a start key is selected in the operation portion 4 (S2).

Next, the controller 30 temporarily stops the image formation by, for example, an adjusting operation of the image forming portion during a continuous job, and interrupts the continuous job (S3).

Next, the controller 30 causes the motor driver 503 to drive the motor M2 at 2500 pps (S4).

Next, the controller 30 executes a separation operation of separating the pressure roller 330 from the fixing belt 310 while driving the motor M2 at 2500 pps (S5).

Next, the controller 30 executes a contact operation of bringing the pressure roller 330 into contact with the fixing belt 310 while driving the motor M2 at 2500 pps (S6). Here, in the case where the "image quality priority mode" is selected, a waiting time (down time) from the start of the separation between the fixing belt 310 and the pressure roller 330 to the completion of re-pressing is about 6 seconds.

Next, the controller 30 starts image formation (S7), and then, ends the image formation processing after passing of a predetermined number of sheets.

On the other hand, in a case where the "image quality priority mode" is not selected in the process of step S1 (step S1: No), the controller 30 determines whether the "glossiness priority mode" is selected (S8).

In a case where the "glossiness priority mode" is selected (step S8: Yes), the controller 30 acquires recording material information regarding a type and a basis weight of a recording material from the operation portion 4, and starts image formation when the start key is selected in the operation portion 4 (S9).

Next, the controller 30 temporarily stops the image formation by, for example, an adjusting operation of the image forming portion during a continuous job, and interrupts the continuous job (S10).

Next, the controller 30 determines whether an environmental temperature is 18° C. or higher (a predetermined temperature or higher) (S11).

When the environmental temperature is lower than 18° C. (lower than the predetermined temperature) (step S11: No), the controller 30 proceeds to the process of step S4. Here, in the case where the "glossiness priority mode" is selected, a waiting time (down time) from the start of separation between the fixing belt 310 and the pressure roller 330 to the completion of re-pressing is about 5 seconds.

On the other hand, when the environmental temperature is 18° C. or higher (the predetermined temperature or higher) (step S11: Yes), the controller 30 causes the motor driver 503 to drive the motor M2 at 3000 pps (S12), and then, proceeds to the process of step S5. In the process of step S5, the controller 30 executes the separation operation of separating the pressure roller 330 from the fixing belt 310 while driving the motor M2 at 3000 pps (S5). In the process of step S6, the controller 30 performs the contact operation of bringing the pressure roller 330 into contact with the fixing belt 310 while driving the motor M2 at 3000 pps (S6).

In addition, in a case where the "glossiness priority mode" is not selected in the process of step S8 (step S8: No), the controller 30 determines whether the "productivity priority mode" is selected (S13).

In a case where the "productivity priority mode" is selected (step S13: Yes), the controller 30 acquires recording material information regarding a type and a basis weight of a recording material from the operation portion 4, and starts image formation when the start key is selected in the operation portion 4 (S14).

Next, the controller 30 temporarily stops the image formation by, for example, an adjusting operation of the image forming portion during a continuous job, and interrupts the continuous job (S15).

Next, the controller 30 determines whether an environmental temperature is 18° C. or higher (S16).

When the environmental temperature is lower than 18° C. (step S16: No), the controller 30 proceeds to the process of step S4. Here, in the case where the "productivity priority mode" is selected, a waiting time (down time) from the start of separation between the fixing belt 310 and the pressure roller 330 to the completion of re-pressing is about 4 seconds. At this time, a time during which the pressure roller 330 moves between the abutment position and the separation position is a third time.

On the other hand, when the environmental temperature is 18° C. or higher (step S16: Yes), the controller 30 causes the motor driver 503 to drive the motor M2 at 4000 pps (S17), and then, proceeds to the process of step S5. In the process of step S5, the controller 30 executes the separation operation of separating the pressure roller 330 from the fixing belt 310 while driving the motor M2 at 4000 pps (S5). In the process of step S6, the controller 30 performs the contact operation of bringing the pressure roller 330 into contact with the fixing belt 310 while driving the motor M2 at 4000 pps (S6). At this time, a time during which the pressure roller 330 moves between the abutment position and the separation position is the first time. The first time is shorter than the third time. In addition, the second time is shorter than the third time.

In addition, in a case where the "productivity priority mode" is not selected in the process of step S13 (step S13: No), the controller 30 determines whether the "silence priority mode" is selected (S18).

In a case where the "silence priority mode" is selected (step S18: Yes), the controller 30 acquires recording material information regarding a type and a basis weight of a recording material from the operation portion 4, and starts image formation when the start key is selected in the operation portion 4 (S19).

Next, the controller 30 temporarily stops the image formation by, for example, an adjusting operation of the image forming portion during a continuous job, and interrupts the continuous job (S20).

Next, the controller 30 drives the motor M2 at 1000 pps by the motor driver 503 (S21), and then, proceeds to the process of step S5.

In the process of step S5, the controller 30 executes the separation operation of separating the pressure roller 330 from the fixing belt 310 while driving the motor M2 at 1000 pps (S5). In the process of step S6, the controller 30 performs the contact operation of bringing the pressure roller 330 into contact with the fixing belt 310 while driving the motor M2 at 1000 pps (S6).

In this manner, the controller 30 makes an abutment/separation speed of the pressure roller 330 with respect to the fixing belt 310 in the "silence priority mode" slower than an abutment/separation speed of the pressure roller 330 with respect to the fixing belt 310 in the "productivity priority mode".

Here, in the case where the "silence priority mode" is selected, a waiting time (down time) from the start of the separation between the fixing belt 310 and the pressure roller 330 to the completion of re-pressing is about 6 seconds.

On the other hand, the controller 30 returns to the process of step S1 in the case where the "silence priority mode" is not selected (step S18: No).

In the present embodiment, the abutment/separation speed between the pressure roller 330 and the fixing belt 310 by the pressure drive portion 391 in the "productivity priority mode" is made faster than the abutment/separation speed in the "silence priority mode" when the continuous job is interrupted. As a result, when the continuous job is interrupted, the temperature rise of the pressure roller 330 can be suppressed, and the pressure roller 330 and the fixing belt 310 can be brought into and out of contact with each other at an optimum speed according to a use situation.

Second Embodiment

Since a configuration of an image forming apparatus according to a second embodiment of the present invention is the same as that of FIG. 1, the description thereof will be omitted. In addition, a configuration of a fixing device according to the present embodiment is the same as that of FIGS. 2 to 10, the description thereof will be omitted.

Operation of Fixing Device

The operation of the fixing device according to the second embodiment of the present invention will be described in detail with reference to FIGS. 15 to 18.

Figure 15:
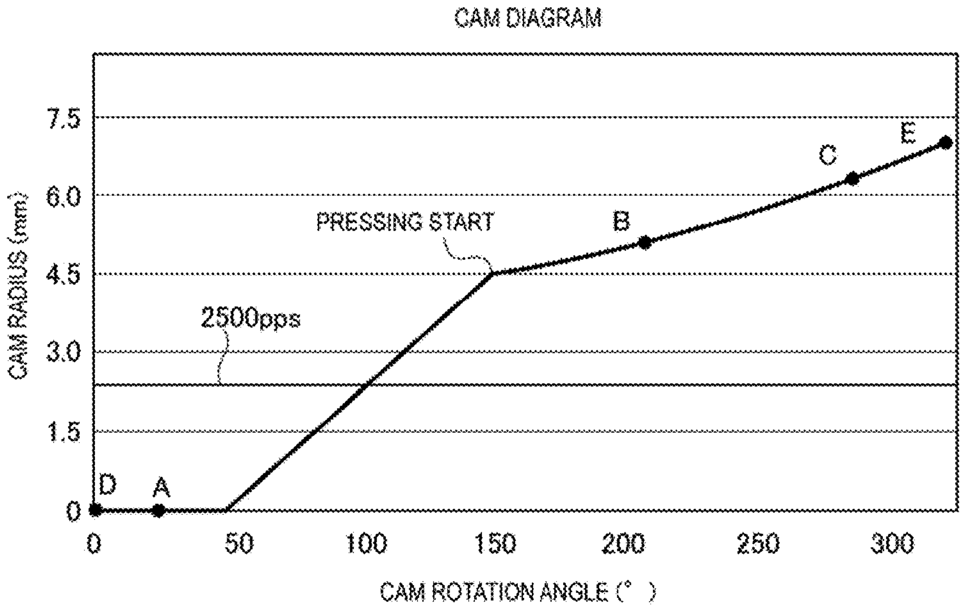
FIG. 15 is a view illustrating a relationship between a rotation angle of the cam and a radius of the cam in an image quality priority mode of the fixing device according to the embodiment of the present invention.
Figure 16:
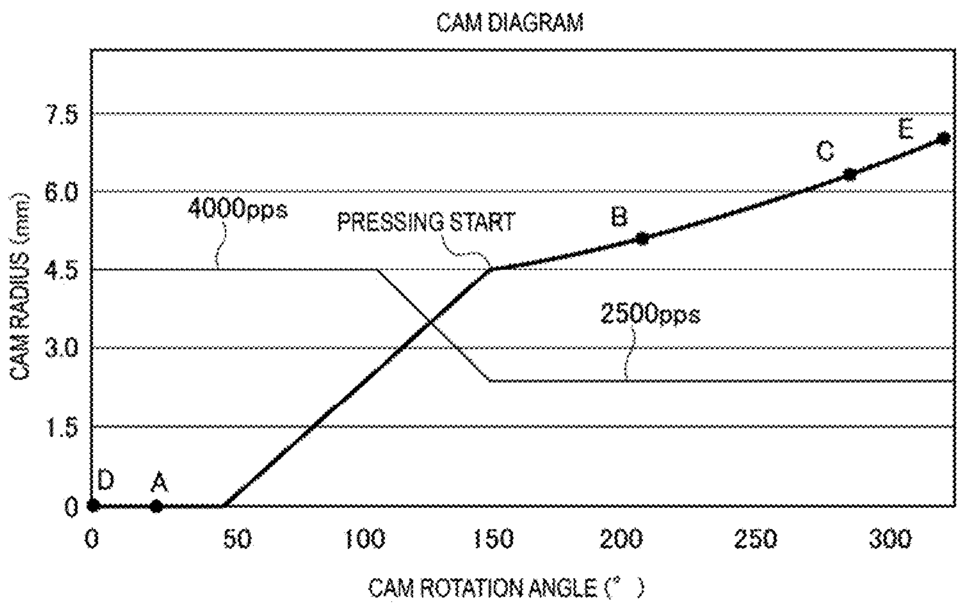
FIG. 16 is a view illustrating a modified example of the relationship between the rotation angle of the cam and the radius of the cam in the image quality priority mode of the fixing device according to the embodiment of the present invention.

In the first embodiment, the motor M2 is uniformly driven at 2500 pps from the point A to the point B illustrated in FIGS. 11A and 11B in the "image quality priority mode" as illustrated in FIG. 15. On the other hand, in the present embodiment, the motor M2 is driven at 4000 pps so as not to receive a load generated by pressing from the point A to a start position of pressing between the fixing belt 310 and the pressure roller 330, and is driven at 2500 pps from the start position of pressing to the point B as illustrated in FIG. 16. As a result, it is possible to more effectively suppress a waiting time (down time) from the start of separation between the fixing belt 310 and the pressure roller 330 to the completion of re-pressing.

Figure 17:
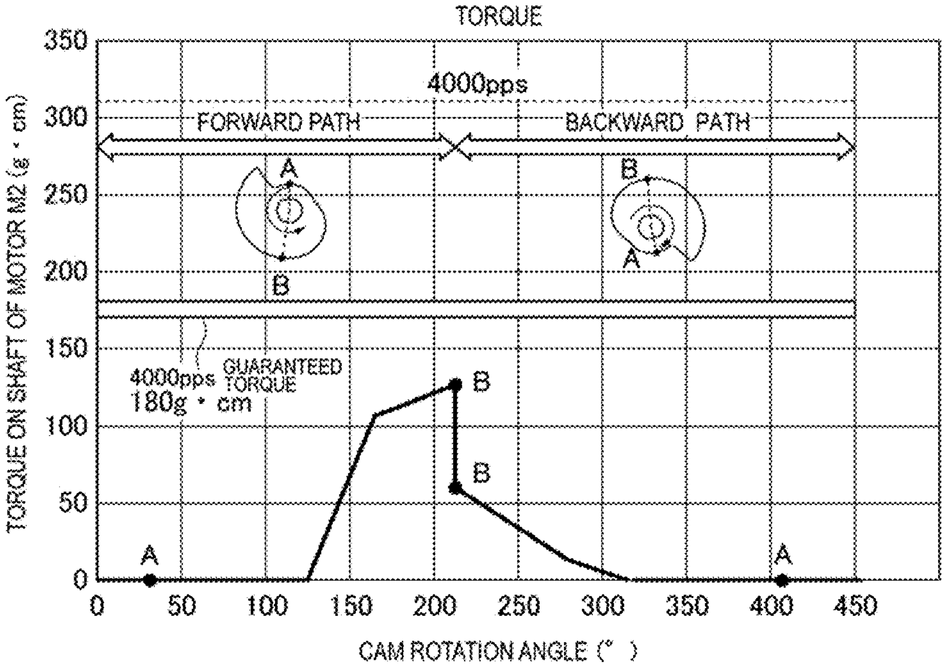
FIG. 17 is a view illustrating a relationship between a rotation angle of the cam and a torque on the shaft of the motor in a productivity priority mode of the fixing device according to the embodiment of the present invention.

In the first embodiment, the motor M2 is uniformly driven at 4000 pps in a forward path and a backward path between the point A and the point B in the "productivity priority mode" as illustrated in FIG. 17.

Here, the forward path is a path in which the pressure roller 330 is made to abut on the fixing belt 310 from the separation position to the abutment position, and the backward path is a path in which the pressure roller 330 is separated from the fixing belt 310 from the abutment position to the separation position.

Figure 18:
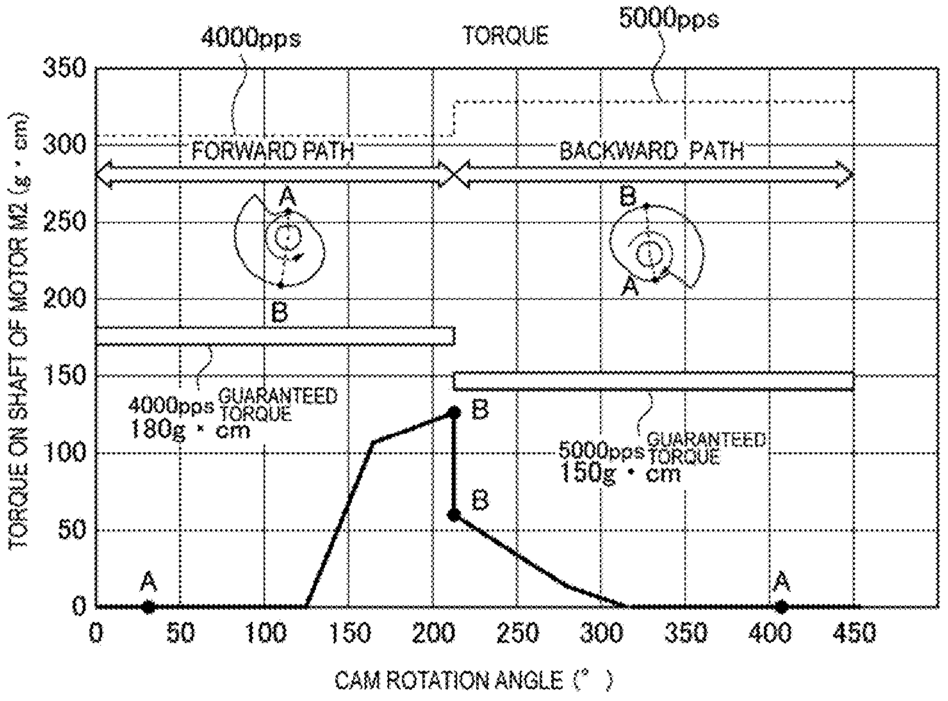
FIG. 18 is a view illustrating a modified example of the relationship between the rotation angle of the cam and the torque on the shaft of the motor in the productivity priority mode of the fixing device according to the embodiment of the present invention.

On the other hand, a forward path is an operation of compressing the pressure spring 331 and the pressure spring 337, and a backward path is an operation of releasing forces stored in the pressure spring 331 and the pressure spring 337 in the present embodiment, and thus, a torque on the shaft of the motor M2 is smaller in the backward path than that in the forward path. Therefore, as illustrated in FIG. 18, the motor M2 can be driven at an abutment speed of 4000 pps in the forward path and can be driven at a separation speed of 5000 pps in the backward path. Here, a driving torque at the point B is 130 g·cm in the forward path and 60 g·cm in the backward path. Since a guaranteed torque at the time of driving at 5000 pps is 150 g·cm, a sufficient safety factor can be secured even when driving is performed at 5000 pps only in the backward path.

Here, in the case where the "productivity priority mode" is selected, a waiting time (down time) from the start of separation between the fixing belt 310 and the pressure roller 330 to the completion of re-pressing is about 3.5 seconds. When a driving speed in the backward path is made faster than a driving speed in the forward path according to the torque on the shaft of the motor M2 in this manner, it is possible to effectively suppress the waiting time due to the temporary stop.

In this manner, the waiting time (down time) due to the temporary stop can be effectively suppressed according to an intended use. In addition, in a case where silence is emphasized in an office or the like, it is possible to shift to the operation for reducing the volume of the operating sound, which can contribute to improvement of the office environment or the like.

Note that operations other than the above in the operation of the fixing device according to the present embodiment are the same as those of the operation of the fixing device 8 according to the first embodiment, and thus, the description thereof will be omitted.

It goes without saying that the present invention is not limited to the above embodiments, and various modifications can be made within a scope not departing from the gist of the present invention.

Specifically, the "image quality priority mode", the "productivity priority mode", the "silence priority mode", or the "glossiness priority mode" can be selected in the first embodiment and the second embodiment, but the mode is not limited thereto, and modes other than the above can be selected. In this case, the motor M2 is driven at a speed corresponding to each mode.

Although the driving speed of the motor M2 varies depending on whether the environmental temperature is 18° C. or higher in the first embodiment and the second embodiment, the present invention is not limited thereto, and the driving speed of the motor M2 may vary depending on whether the environmental temperature is equal to or higher than an environmental temperature other than 18° C.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-033276, filed Mar. 4, 2022, which is hereby incorporated by reference herein in its entirety.

What is claimed is:

1. An image forming apparatus, comprising:
a controller configured to control execution of a job;
a heating rotating member configured to be rotatable and apply heat to a recording material;
a pressure rotating member configured to abut on the heating rotating member, be rotatable, and form a nip portion together with the heating rotating member and fix a toner image to the recoding material; and
a moving unit configured to move at least one of the heating rotating member and the pressure rotating member to an abutment position at which the nip portion is formed and a separation position at which the heating rotating member and the pressure rotating member are separated from each other,
wherein the controller executes a job of forming images on the recording material in one mode out of a plurality of modes including a first mode and a second mode, a time moving from the abutment position to the separation position in a case where the image formation is performed in the first mode is a first time, a time moving from the abutment position to the separation position in a case where the image formation is performed in the second mode is a second time, and the first time is shorter than the second time.

2. The image forming apparatus according to claim 1, wherein
the moving unit moves the pressure rotating member.

3. The image forming apparatus according to claim 2, wherein
a speed at which the pressure rotating member moves from the abutment position to the separation position in the case where the image formation is performed in the first mode is a first speed, a speed at which the pressure rotating member moves from the abutment position to the separation position in the case where the image formation is performed in the second mode is a second speed, and the first speed is higher than the second speed.

4. The image forming apparatus according to claim 1, wherein
the moving unit includes an eccentric cam, and
the moving unit rotates the eccentric cam to move from the abutment position to the separation position.

5. The image forming apparatus according to claim 1, further comprising
a temperature detection portion configured to detect an environmental temperature,
wherein, in the case where the image formation is performed in the first mode, a time moving from the abutment position to the separation position when the temperature detected by the temperature detection portion is a predetermined threshold or higher is the first time, and a time moving from the abutment position to the separation position when the temperature detected by the temperature detection portion is lower than the predetermined threshold is a third time, the first time being shorter than the third time.

6. The image forming apparatus according to claim 5, wherein
the second time is shorter than the third time.

7. The image forming apparatus according to claim 1, wherein
a time moving from the abutment position to the separation position when a job is interrupted in the case where the image formation is performed in the first mode is the first time, and a time moving from the abutment position to the separation position when the job is interrupted in the case where the image formation is performed in the second mode is the second time.

8. The image forming apparatus according to claim 1, wherein the first mode is a mode in which a time during which the job is interrupted is shortened.

9. The image forming apparatus according to claim 1, wherein the second mode is a mode in which an operating sound of the moving unit is set to be silent.

10. An image forming apparatus comprising:

the image forming apparatus according to claim 1; and an operation portion configured to be operable by an operator, wherein one mode is selectable from a plurality of modes including the first mode and the second mode by the operation portion.

11. An image forming apparatus, comprising:

a controller configured to control execution of a job;

an image forming unit configured to form an image on a recording material;

a fixing device configured to apply heat and pressure at a nip portion to fix a toner image to the recording material;

wherein the fixing device comprises:

a heating rotating member configured to be rotatable and apply heat to a recording material;

a pressure rotating member configured to abut on the heating rotating member, be rotatable, and form the nip portion together with the heating rotating member; and a moving unit configured to move at least one of the heating rotating member and the pressure rotating member to an abutment position at which the nip portion is formed and a separation position at which the heating rotating member and the pressure rotating member are separated from each other, wherein the controller executes a job of forming images on the recording material in one mode out of a plurality of modes including a first mode and a second mode, a time moving from the separation position to the abutment position in a case where the image formation is performed in the first mode is a first time, a time moving from the separation position to the abutment position in a case where the image formation is performed in the second mode is a second time, and the first time is shorter than the second time.

12. The image forming apparatus according to claim 11, wherein the moving unit moves the pressure rotating member.

13. The image forming apparatus according to claim 12, wherein a speed at which the pressure rotating member moves from the separation position to the abutment position in the case where the image formation is performed in the first mode is a first speed, a speed at which the pressure rotating member moves from the separation position to the abutment position in the case where the image formation is performed in the second mode is a second speed, and the first speed is higher than the second speed.

14. The image forming apparatus according to claim 11, wherein the moving unit includes an eccentric cam, and the moving unit rotates the eccentric cam to move from the separation position to the abutment position.

15. The image forming apparatus according to claim 11, further comprising a temperature detection portion configured to detect an environmental temperature, wherein, in the case where the image formation is performed in the first mode, a time moving from the separation position to the abutment position when the temperature detected by the temperature detection portion is a predetermined threshold or higher is the first time, and a time moving from the separation position to the abutment position when the temperature detected by the temperature detection portion is lower than the predetermined threshold is a third time, the first time being shorter than the third time.

16. The image forming apparatus according to claim 15, wherein the second time is shorter than the third time.

17. The image forming apparatus according to claim 11, wherein a time moving from the separation position to the abutment position when a job is interrupted in the case where the image formation is performed in the first mode is the first time, and a time during a time moving from the separation position to the abutment position when the job is interrupted in the case where the image formation is performed in the second mode is the second time.

18. The image forming apparatus according to claim 11, wherein the first mode is a mode in which a time during which the job is interrupted is shortened.

19. The image forming apparatus according to claim 11, wherein the second mode is a mode in which an operating sound of the moving unit is set to be silent.

20. The image forming apparatus according to claim 11, further comprising:

an operation portion configured to be operable by an operator, wherein one mode is selectable from a plurality of modes including the first mode and the second mode by the operation portion.

* * * * *